UNITED STATES PATENT OFFICE.

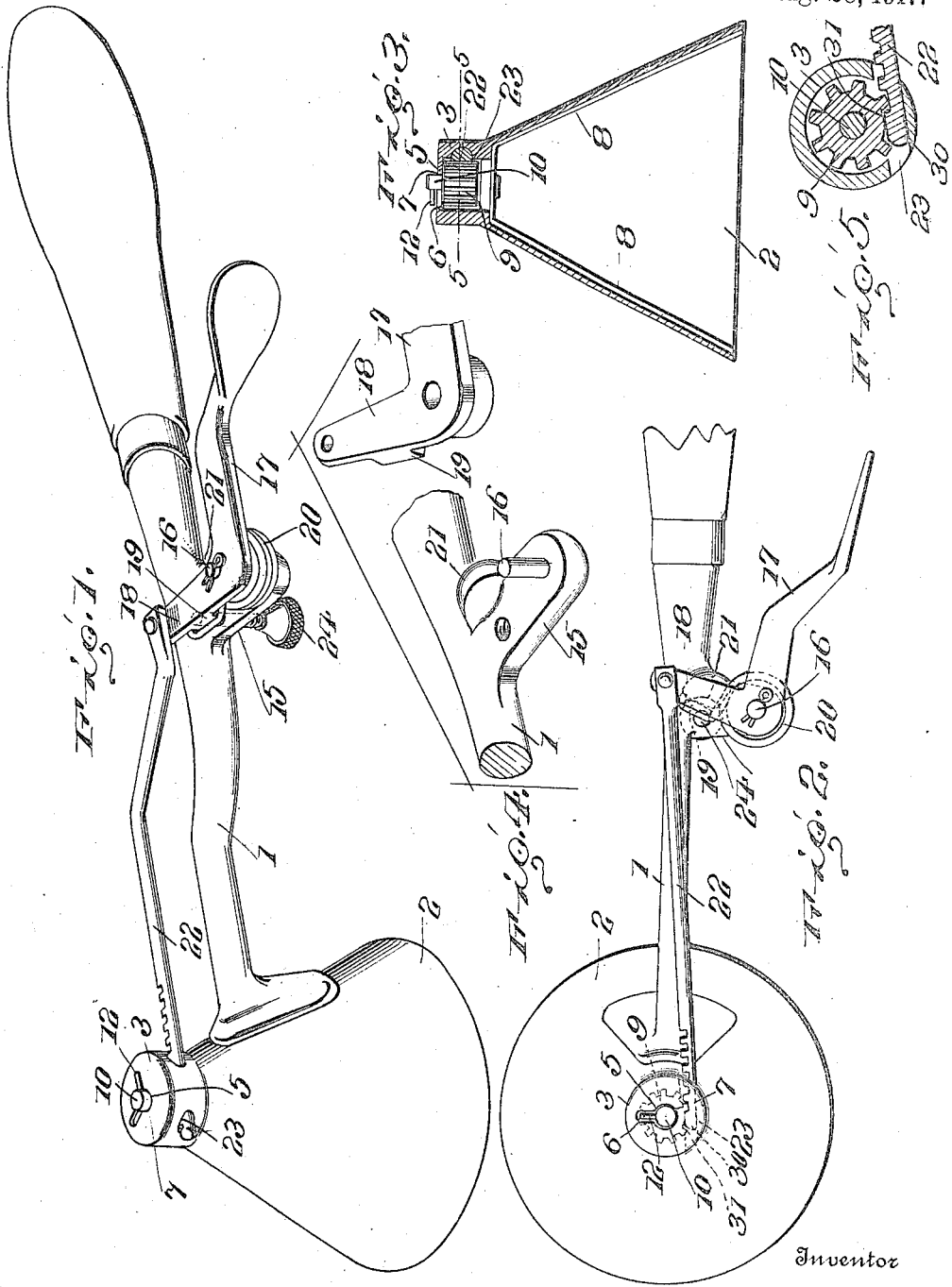

RASMUS NIELSEN, OF TROY, NEW YORK, ASSIGNOR TO THE GILCHRIST COMPANY, OF NEWARK, NEW JERSEY, A CORPORATION OF NEW JERSEY.

ICE-CREAM SPOON.

1,238,429.                Specification of Letters Patent.        Patented Aug. 28, 1917.

Application filed January 6, 1912. Serial No. 669,903.

*To all whom it may concern:*

Be it known that I, RASMUS NIELSEN, citizen of United States, residing at Troy, in the county of Rensselaer and State of New York, have invented certain new and useful Improvements in Ice-Cream Spoons, and do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in ice cream spoons.

The object of the invention is to provide economical and simple means for disengaging the scraper from the bowl of the spoon for conveniently cleaning or repairing the parts.

The invention comprehends improvements in the details of construction and arrangement of parts.

In the drawings:

Figure 1 is a perspective view of my improved spoon, the parts being assembled in operative position.

Fig. 2 is a plan view illustrating the position of the parts when disconnecting the scraper from the bowl.

Fig. 3 is a transverse section on the line 3—3 of Fig. 2.

Fig. 4 is a detail perspective view of a portion of the handle and the finger operating element.

Fig. 5 is a section on line 5—5 of Fig. 3.

1 indicates a handle on the end of which is secured a bowl 2. The end of the bowl is provided with an extended housing 3 formed with a centrally disposed opening 4, the upper part of which is restricted by an overhanging flange 5. A lateral slot 6 communicates with the restricted part 7 of the opening 4 to afford means for disconnecting the scraper.

Fitting in the bowl 2 is a scraper 8 on the end of which is a pinion 9 formed with a trunnion 10. The pinion 9 fits in the opening 4 and the trunnion 10 passes through the restricted opening 7. Extending laterally from the trunnion 10 is a lug 12 designed to pass through the lateral slot 6 when removing the scraper and supported on the flange 5 when the parts are assembled.

Extending from the handle 1 is an ear 15 from which extends a post 16. Mounted on the post 16 is a finger operating lever 17 provided with an arm 18. Depending from the finger operating lever 17 is a hub and from the arm 18 depends a lug 19. A spring 20 is coiled around the hub and has one end fastened to the ear 15 and its opposite end is fastened to the lug 19, the tension of the spring being such as to normally draw the arm 18 in the direction of the free end of the handle. This movement however, is limited by a stop 21 on the handle so as to prevent the spring turning the finger piece so far that parts would become separated.

Pivoted to the arm 18 is a rack bar 22, the forward free end of which fits in a longitudinal opening 23 in the housing 3. This opening intersects the opening 4, so that the teeth of the rack bar mesh with the pinion 9.

Extending through a threaded opening in the ear 15 is a screw 24 the upper end of which, when screwed upwardly (as viewed from Fig. 1) will be in the path of movement of the lug 19 and forms a stop to limit the movement of the finger operating lever.

When the lug abuts against the screw the lug 12 is out of alinement with the lateral slot 6 and thereby supports the scraper in operative position in the bowl. When the finger piece 17 is pressed toward the handle, the parts are so proportioned that the rack cannot turn the scraper far enough to bring the lug into registry with the slot so that so long as the screw is in operative position the scraper cannot be removed.

To remove the scraper, the screw is withdrawn from the path of the lug 19 and the spring will upon release of pressure on the finger piece turn the latter until the lug abuts against the stop 21. At this time the rack bar has turned the pinion to the position shown in Fig. 2, and the lug 12 registers with the lateral slot 6, and the scraper will fall from the bowl.

To assemble the parts, the scraper is inserted in the bowl and the pressure is applied to the finger piece and the latter is turned sufficiently to move the lug 19 past the screw 24 and then the latter is turned to bring its end into the path of said lug.

When the scraper is removed the stop 21 prevents the rack being entirely withdrawn from the opening 23 and the spring throwing the finger piece so far around as to dislodge the spring from the ear.

To insure of the parts being in proper position when fitting the scraper in the bowl, the end of the free rack is provided with an elongated tooth 30, and the pinion 9 has several teeth omitted to form a space 31 between adjacent teeth to correspond to the width of the tooth 30.

The stop 21 limits the movement of the rack bar 22, and brings the tooth 30 opposite the lug 12, consequently when the scraper is inserted in the bowl the tooth 30 and the space 31 on the pinion register and the lug 12 registers with the slot 6. This absolutely insures of the parts being properly positioned to permit quick and ready assembling of the parts.

What I claim is:

1. An ice cream spoon comprising a handle and bowl formed with a bearing having a slot communicating therewith, a scraper operating in the bowl and provided with a pinion and a trunnion, a lug extending from the trunnion and adapted to pass through the slot when assembling the scraper in the bowl, or when removing said scraper, means engaging the pinion for operating the scraper, and means for preventing the lug registering with the slot.

2. An ice cream spoon comprising a handle and bowl formed with a bearing having a slot communicating therewith, a scraper operating in the bowl, and provided with a pinion and a trunnion, a lug extending from the trunnion and adapted to pass through the slot when assembling the scraper in the bowl, or when removing said scraper, and adjustable means on the handle for preventing the lug registering with the slot.

3. An ice cream spoon comprising a handle and a bowl, said bowl having a restricted bearing with a radial slot, a scraper operating in the bowl, said scraper having a trunnion fitting in the restricted bearing, a lug extending from the trunnion and adapted to pass through the radial slot, means for operating the scraper and means for coöperating with the operating means for holding the lug out of registry with the radial slot.

4. An ice cream spoon comprising a handle and a bowl, said bowl having a restricted bearing formed with a radial slot, a scraper operating in the bowl, a trunnion on said scraper within said bearing, a lug extending from the trunnion and adapted to pass through the radial slot, a pivoted finger operating element on the handle, a lug extending from the operating element, a spring for operating the finger operating element in one direction, an adjustable stop with which the lug on the finger element abuts to prevent the lug on the trunnion registering with the radial slot, and means between the finger operating element and the scraper to rotate the latter in the bowl.

5. An ice cream spoon comprising a handle and a bowl, said bowl having a restricted bearing formed with a radial slot, a scraper operating in the bowl, a trunnion on said scraper within said bearing, a lug extending from the trunnion and adapted to pass through the radial slot, a pivoted finger operating element on the handle, a lug extending from the operating element, a spring for operating the finger operating element in one direction, an adjustable stop with which the lug on the finger element abuts to prevent the lug on the trunnion registering with the radial slot, means between the finger operating element and the scraper to rotate the latter in the bowl, and means on the handle to limit the movement of the finger operating element when the adjustable stop is removed from the path of the lug, whereby to bring the lug on the trunnion in registry with the radial slot in the bearing.

6. An ice cream spoon comprising a bowl and a handle, said bowl having a housing formed with a restricted bearing formed with a radial slot, the housing having a transverse opening which intersects the bearing, a scraper in the bowl, said scraper having a pinion and a trunnion, the latter fitting in the restricted bearing, means for removably holding the scraper in the bowl adapted to pass through said radial slot, a rack operating in the transverse opening, a pivoted finger lever to which the rack is pivoted, an adjustable stop between the pivoted lever and the handle to limit the movement of the former and a spring for rotating the scraper in one direction.

7. An ice cream spoon comprising a handle and a bowl, said bowl having a bearing formed with a radial slot, a scraper operating in the bowl, said scraper having a pinion and a trunnion, the latter fitting in the bearing, a lug extending from the trunnion and adapted to pass through the lateral slot, a rack engaging the pinion to rotate the scraper, means for reciprocating the rack, and adjustable means for regulating the movement of the pinion to prevent the lug registering with the radial slot when operating the spoon.

8. An ice cream spoon comprising a bowl formed with a bearing, a handle, a scraper operating in the bowl, a pinion, a trunnion carried by the scraper, a finger operating element pivoted to the handle, a rack pivoted to the finger operating element and meshing with the pinion, two stops for limiting the movement of the finger-operating element in one direction, one of the stops being adjustable, a spring to operate the scraper in one direction and applied to press the finger-operating element in the direction of said stops, and means for removably holding the scraper in operative position in the bowl, permitting removal of the scraper when the finger operated element is arrested by one of the stops and operative to hold the scraper in the bowl when the finger operating element is arrested by the other stop.

9. An ice cream spoon comprising a handle and a bowl, said bowl having a bearing formed with a radial slot, a scraper operating in the bowl, a pinion and a lug carried by the scraper, said lug adapted to pass through said radial slot when inserting or removing the scraper from the bowl, means including a finger operating element and a rack for rotating the scraper in the bowl, the rack meshing with the pinion, and adjustable means for limiting the movement of the operating means to retain the lug out of registry with the radial slot.

10. An ice cream spoon comprising a handle and a bowl, the latter having a bearing formed with a radial slot, a scraper operating in the bowl, said scraper carrying a pinion and a lug, the latter coöperating with the radial slot when inserting or removing the scraper from the bowl, means for rotating the scraper in the bowl, including a finger operating element and a rack, the latter meshing with the pinion, adjustable means between the finger operating element and the handle to retain the lug out of registry with the radial slot, and a spring for operating the scraper in one direction, the tension of said spring serving to rotate the scraper to bring the lug into registry with the radial slot when the adjustable stop is removed, whereby said scraper may be removed from the bowl.

11. An ice cream spoon comprising a handle and a bowl, said bowl having a bearing and a radial slot communicating therewith, a scraper in the bowl, said scraper having a mutilated pinion, a lug and a journal, a rack formed with teeth, one of the latter being substantially the width of the mutilated portion of the pinion, the lug and the radial slot being in registry when the mutilated portion of the gear meshes with its tooth on the rack, means for operating the rack, and means for preventing the lug registering with the radial slot, after the parts are assembled.

12. An ice cream spoon comprising a handle, a bowl formed with a bearing having a slot communicating therewith, a scraper operating in the bowl, a pinion and trunnion on said scraper, a housing for the bearing, said housing having a passage, a lug on said trunnion adapted to pass through said slot when assembling the scraper in the bowl or removing the scraper therefrom, and means for preventing the lug from registering with the slot, said means comprising a lug and a screw threaded member which coöperate with said lug.

13. An ice cream spoon comprising a bowl and handle, a scraper mounted to operate in the bowl, a gear associated with the scraper, means including a trunnion and a lug secured to rotate with the scraper to hold the latter in the bowl, the bowl having an opening through which the trunnion and lug pass, means coöperating with the pinion to operate the scraper and position the lug to prevent passage through the opening, and means for holding the latter means in operable position, said opening permitting the lug to pass therethrough only when it is alined therewith in one predetermined position.

14. In a device of the class described, a cup, a scraper positioned therein and removable therefrom, two coöperating scraper retaining members, one being attached to the cup and the other being rotatable with the scraper, said retaining members coöperating with each other so that when one is moved to a certain position relative to the other the scraper can be withdrawn from the cup, and spring-controlled scraper-actuating means operative to impart rotative movement to the scraper, said scraper-actuating means being movable without relaxing the spring to a further operative position wherein the scraper-retaining members are adapted to permit such withdrawal of the scraper from the cup.

15. In a device of the class described, a cup, a removable scraper positioned therein, retaining means including a part rotatable with the scraper and a part stationary on the cup, a finger lever, means connecting the finger lever to the scraper, a spring for impelling the finger lever, and a stop positioned in the path of the finger lever to arrest the movement thereof in the spring pressed direction and to keep the rotatable part in engagement with the stationary part of said retaining means, said stop being movable to permit the finger lever to be impelled to a further position wherein the rotatable part will become disengaged from the stationary part of the retaining means, thereby permitting removal of the scraper from the cup.

16. In an ice cream disher, the combination of a cup provided with a slot, a scraper, a retaining member attached to said scraper, and adapted to be moved through and beyond the slot for the purpose of maintaining said scraper against inadvertent disengagement from the cup, and scraper operating means for imparting rotative movement to the scraper.

17. In an ice cream disher, the combination of a cup provided with an opening and with a slot in communication with said opening, a scraper provided with a stem adapted to occupy said opening in the cup, a retaining member projecting from the stem and operable to maintain the scraper against disengagement from the cup, said retaining member being movable with the stem and passing through the slot in the operations of inserting or withdrawing the scraper, and scraper operating means for imparting rotative movement to the scraper.

18. In an ice cream disher, the combination of a cup provided with a chambered base and with a slot in said chambered base, a scraper, a stem rigid with said scraper, a gear fast with the stem and adapted to occupy the chamber in the base of said cup, a retaining member projecting from the stem, said retaining member being out of register with the slot in the normal operative position of the scraper, and means for imparting rotative movement to the gear and scraper.

19. In an ice cream disher, the combination of a cup, a scraper, a rack for imparting rotative movement to the scraper, a gear on the scraper in position to mesh with the rack, and a scraper retaining member attached to the scraper, said gear having means for preventing its teeth from meshing with the teeth of the rack until the retaining member is in a proper position to pass through the cup.

20. In an ice cream disher, the combination of a cup, a scraper, means for rotating the scraper, and a retaining member mounted on the scraper and coöperable with a portion of the cup, independently of the scraper operating means, for maintaining said scraper against the inadvertent disengagement from the cup, said retaining member being movable with the scraper in the operations of inserting and removing it relative to the cup.

21. In an ice cream disher, the combination of a cup provided with a slot, a scraper having a stem, a retaining member on said stem, a gear attached to the stem, said retaining member and the gear partaking of the movement of the scraper in the operations of inserting and withdrawing it relative to the cup, a spring actuated finger lever, means pivoted to said finger lever and operable thereby for imparting rotative movement to the gear and scraper, and means for arresting the movement of the finger lever, in the direction in which it is actuated by the spring, said arresting means being shiftable to a position whereby the retaining member is adapted to be brought into register with the slot in the cup for the purpose of allowing the withdrawal of the scraper from the cup.

22. In an ice cream disher, the combination of a cup provided with a slot, a scraper having a stem, a finger lever, means connecting the finger lever to the scraper stem, whereby manipulation of the finger lever operates the scraper, a retaining member, independent of the scraper operating means, projecting from the scraper stem, and movable with the scraper in the operations of inserting and removing it relative to the cup, and a stop for arresting the finger lever and limiting the movement of the retaining member relative to the slot in the cup, said stop being movable to a position, whereby the retaining member is adapted to aline with the slot in the cup for the purpose of allowing the removal of the scraper from the cup.

23. In an ice cream disher, the combination of a cup provided with a slot, a scraper having a stem, a gear attached to the stem, a rack meshing with the gear, a spring actuated finger lever pivoted to said rack, a stop arresting the movement of the finger lever in the direction in which it is actuated by the spring, and a retaining member, separate and independent of the scraper operating means, projecting from the stem of the scraper and movable with said scraper in the operations of inserting and removing it relative to the cup, the arresting stop being movable to a position wherein the retaining member is adapted to register with the slot in the cup to allow of the scraper being removed from the cup.

24. In an ice cream disher, the combination of a cup, a scraper within said cup, scraper operating means for imparting rotative movement to the scraper, a retaining member independent of the scraper rotating means, movable with said scraper, and means for arresting the movement of the scraper operating means, whereby said retaining member is precluded from releasing the scraper, and said arresting means being operable for the scraper to turn to a position wherein the releasing member is adapted to release the scraper from restraint, and thus enable it to be easily removed from the cup.

25. In an ice cream disher, the combination of a cup, a scraper therein, a pivoted finger lever for imparting rotative movement to the scraper, a spring for actuating the finger lever, a stop device for arresting the movement of the finger lever independent of the point of pivoting of the finger lever, and a retaining member independent of the scraper operating means for holding the scraper within the cup in the normal operation of the parts, said stop device being shiftable to a position wherein the scraper is freed from the restraint of the retaining device, said retaining device being attached to the scraper for partaking of its movements in the operations of inserting and removing it relative to the cup.

26. In a device of the class described, the combination of a cup, a scraper positioned therein, retaining means normally in engagement with the cup for precluding displacement of the scraper from the cup, said retaining means being movable to a position which permits the scraper to be withdrawn from said cup, and spring actuated means for imparting rotative movement to the scraper, said spring actuated means being movable to a further position without relaxing the spring and wherein the retaining means are adapted to permit withdrawal of the scraper.

27. In a device of the class described, the combination of a cup, a scraper positioned therein, spring actuated means for imparting rotative movement to the scraper, and retaining means including a rotatable part and a relatively stationary part for precluding displacement of the scraper from the cup, said rotatable part of the retaining means being controllable by the movement to a predetermined position of the spring actuated means for permitting withdrawal of the scraper from the cup.

28. In a device of the class described, the combination of a cup, a scraper positioned therein, spring actuated means for imparting rotative movement to the scraper, and retaining means separate from the spring actuated means for precluding withdrawal of the scraper from the cup in the normal operative position of said spring actuated means, said retaining means including a rotatable part and a relatively stationary part, and said rotatable part being controllable by a movement to a predetermined position of the spring actuated means for automatically disengaging itself from the stationary part, thereby releasing the scraper and permitting its withdrawal from the cup.

29. In a device of the class described, the combination of a cup, a scraper positioned therein, spring actuated means for imparting rotative movement to the scraper, a stop device for limiting the movement of the lever to a certain position in the spring pressed direction, and retaining means for precluding removal of the scraper from the cup, said stop device operating to secure a movement of the spring actuated means to a position which will retain the spring under tension, and said stop device being shiftable to a position which permits a further movement of the spring actuated means so that the scraper may be removed without relaxing the tension of the spring.

30. In a device of the class described, the combination of a cup, a removable scraper positioned therein, a finger lever, means for connecting the scraper and the finger lever for imparting rotative movement to the scraper, a spring for moving the finger lever in one direction, and stop mechanism separate from said finger lever and coöperating therewith for limiting its movement in one direction, said stop mechanism operating to permit a movement of the finger lever to an additional position whereby the scraper may be removed from the cup, said additional movement being accomplished without completely relaxing the tension of the spring.

31. In a device of the class described, the combination of a cup, a removable scraper positioned therein, retaining means coöperating with the scraper, a finger lever, scraper operating means connecting the scraper and the finger lever for imparting rotative movement to the scraper, a spring for moving the finger lever in one direction, and a stop coöperating with the finger lever for limiting the movement thereof in the spring pressed direction, said stop being movable relatively to the path of the finger lever and operating to permit an additional movement of said finger lever for the purpose of permitting the removal of the scraper from the cup while the scraper operating means is left intact, said additional movement being accomplished without entirely relaxing the tension of the spring.

In testimony whereof I have signed my name to this specification in the presence of two subscribing witnesses.

RASMUS NIELSEN.

Witnesses:
LEONARD H. GILES,
NELS NIELSEN.

Copies of this patent may be obtained for five cents each, by addressing the "Commissioner of Patents, Washington, D. C."